United States Patent Office 3,240,649
Patented Mar. 15, 1966

3,240,649
BONDING NEOPRENE TO POLYETHYLENE TEREPHTHALATE FIBERS
Everett C. Atwell, Greensboro, N.C., assignor to Burlington Industries, Inc., Greensboro, N.C., a corporation of Delaware
No Drawing. Filed Nov. 21, 1960, Ser. No. 70,428
3 Claims. (Cl. 156—315)

The present invention relates to certain improvements in the bonding of unvulcanized neoprene rubber to polyethylene terephthalate fibers.

The difficulties involved in obtaining good adhesion between neoprene (polychloroprene) and polyethylene terephthalate fibers are well known in the art and numerous proposals have been made for obtaining an improved bond. However, there is still a real need for new methods and techniques which will provide optimum adhesion between these materials.

Accordingly, the principal object of the present invention is to provide a method of bonding vulcanizable neoprene rubber and polyethylene terephthalate fibers whereby remarkably outstanding adhesion is obtained. A more specific object of the invention is the provision of a unique pretreatment for polyethylene terephthalate fibers to facilitate the increased adhesion to neoprene. Other objects of the invention will also be hereinafter apparent.

Broadly stated, the invention contemplates the use of two specific primers which, when used consecutively in the manner indicated, give a surprisingly high bonding effect between neoprene and polyethylene terephthalate. The first of these primers comprises an organic polyisocyanate such as methylene bis (4-phenylisocyanate). The second primer is an aqueous composition comprising a neoprene latex and a partially condensed resorcinol-formaldehyde reaction product or resole, particularly the base-catalyzed resole described in my copending applications Serial No. 42,956 or Serial No. 49,179, the subject matter of which is incorporated herein by reference.

The reasons for the unique results obtained herein are not fully understood. However, it is apparent that the two primers are mutually adhesive and coact in some unusual way to give a degree of bonding which is significantly in excess of the expected additive effect based on the use of each primer separately. As a matter of fact, treatment of the polyethylene terephthalate with either of the primers alone does not result in any commerically important increase in adhesion above that found between untreated polyethylene terephthalate and neoprene whereas, under otherwise comparable conditions, the method of the present invention increases the adhesion to a commercially significant value which is many times greater than the adhesion between the untreated materials. The unique results of the invention appear to be specific to the bonding of neoprene and polyethylene terephthalate fibers since the dual primers of the invention do not give this improved degree of bonding with other rubbers, e.g., natural rubber, butadiene-acrylonitrile and butadiene-styrene rubbers.

In carrying out the present process, the polyethylene terephthalate fibers (as such or in fabric form) are first impregnated with an organic solvent solution of the organic polyisocyanate. For this purpose, there should be used a moisture-free organic solvent, e.g., chlorinated or alkylated aromatics such as monochlorobenzene, xylene or toluene. While the amount of isocyanate can be widely varied, it is usually desirable to apply a minimum of 0.5% polyisocyanate solids, based on the weight of dry polyethylene terephthalate fibers. An economically practical limit is 2–2.5% polyisocyanate solids. A maximum of 5% is usually in excess and does not provide any further improvement.

As indicated above, methylene bis (4-phenylisocyanate) is a typical polyisocyanate suitable for priming polyethylene terephthalate fibers according to the invention. Monoisocyanates are unsatisfactory but other organic polyisocyanates which may be used are polymethylene polyphenyl polyisocyanate having the formula:

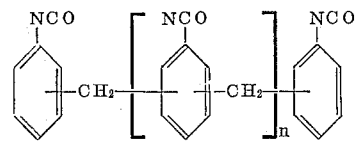

wherein $n$ is an integer, e.g., the product known as PAPI-1 (Carwin Company), in which $n$ has an average value of 1; Mobay's toluene diisocyanate polymer Mondur CB-60; triphenylmethane triisocyanate (Mondur TM); 3,3-dimethoxyl-4,4'-biphenylene diisocyanate; and p,p'-diphenylmethane diisocyanate (Mondur MO).

After the polyisocyanate has been applied as the first primer, the treated polyethylene terephthalate fibers are dried for solvent removal prior to application of the second primer. Usually, the treated material is heated until dry, using temperatures between 200–300° F. The dried, isocyanate treated polyethylene terephthalate fibers may then be treated, either immediately or after storage, with the second primer of the invention. Advantageously, the dried isocyanate-treated material is tack-free and may be rolled up and stored without need for subsequent reactivation of the primer and without detriment to the working properties of the material.

The second primer may be prepared in the manner described in my abovementioned applications Serial No. 42,956 and Serial No. 49,179 except for the substitution of neoprene latex for the butadiene-acrylonitrile latex used in said applications to prepare the aqueous resole/latex composition. The resole herein is identical to the resole of said pending applications and is prepared by partial reaction of resorcinol and formaldehyde using a basic catalyst in the manner indicated. The second primer is desirably organic solvent-free although small amounts of organic solvent may be included. Zinc oxide or other chlorine acceptor (5–15% on the weight of latex solids) should also be included along with, if desired, softening, wetting and antifoaming agents, etc. Further details regarding the preparation of the neoprene latex/resole composition used herein are included below.

Any commercially available neoprene latex may be used in making up the resole/neoprene latex of the invention. A typically suitable latex is available under the tradename "Neoprene 571" or "Neoprene 750."

The second primer (resole/neoprene latex) may be applied to the isocyanate-treated polyethylene terephthalate fibers in any convenient fashion, e.g., by dipping, padding or spraying. The amount of resole/neoprene primer applied to the polyethylene terephthalate fibers will vary depending, for example, upon the weight and construction of the polyethylene terephthalate material. Typically, the amount of add-on solids to be applied will fall within the range of 5 to 15% by weight of the fibers but it will be realized that the specific amount of add-on solids necessary to give maximum mutual bonding will vary from one situation to another. Usually, the ratio of resole to neoprene latex solids, in parts of solids by weight, will come within the range of from about 1:12 to about 1:2.5, preferably 1 part resole solids per 3.5 to 10 parts neoprene latex solids.

After impregnation, all of the water should be removed from the goods by drying. Various drying temperatures and drying rates may be used so long as the fibrous material is completely dry prior to the step of bonding to the vulcanizable neoprene rubber.

The dried, dual primed polyethylene terephthalate prepared in the manner described above, like the single primed material, is characterized by its non-tacky nature and can be rolled up and stored for long periods of time without losing its bonding affinity for neoprene. As will be appreciated, this represents an outstanding advantage since the dried fibrous material can be stored until the neoprene is to be applied thereto. A unique feature of the dried material is that, even after long storage, no reactivation of the treated fabric surface is necessary for effective bonding with neoprene. This is in contrast to known adhesive treated fabrics wherein reactivation, for example, by organic solvent treatment or water, is essential to effect bonding after storage.

The dual primed polyethylene terephthalate fibers, in yarn or fabric form or otherwise, may be bonded to any vulcanizable neoprene rubber or composition containing same. Typical neoprene rubbers are Neoprene GN, CC and RT and these are conventionally available in the form of vulcanizable compositions. A representative vulcanizable neoprene composition may have the following composition:

|  | Parts |
| --- | --- |
| Neoprene GN or CC | 100 |
| Zinc oxide | 5–20 |
| Magnesium oxide | 2–5 |
| Stearic acid | 1–3 |
| Carbon black (filler) | 20–40 |

The neoprene rubber may be applied to the dual treated polyethylene terephthalate in conventional fashion. Thus, for example, vulcanizable neoprene composition as referred to above in sheet form, may be pressed against the dual primed polyethylene terephthalate fabric prepared according to the invention and vulcanized under conventional conditions (e.g., 280° F. to 300° F. and desirably 150 to 250 p.s.i. pressure for 30 to 60 minutes).

The invention is illustrated, but not limited, by the following examples wherein parts and percentages are by weight unless otherwise stated:

EXAMPLE I

This example describes the preparation of a suitable resole/latex composition suitable for use herein as the second primer.

RESOLE/LATEX PRIMER

*Part A (resin solution)*

|  | Parts |
| --- | --- |
| Resorcinol | 5.1 |
| 37% formaldehyde | 6.5 |
| NaOH flakes | .15–.30 |
| Water | 110. |
| (6.25% resin solution), approximately | 122 |

*Part B (20% solids)*

|  | Parts |
| --- | --- |
| 55% neoprene latex No. 571 | 92.5 |
| 57% zinc oxide paste | 13.5 |
| 6.25% resin solution (Part A) | 116.7 |
| Water | 107.5 |
|  | 330.2 |

*Preparation of Part A*

90% of the water for Part A was measured into the resin preparation tank. The caustic soda flakes were added and the mixture stirred until the caustic was dissolved. The resorcinol was then added and dissolved by stirring. The formaldehyde and balance of the water were then added, the temperature of the water having been previously adjusted to 80° F. The resulting mixture was aged for 6 hours under controlled temperature conditions of 80–84° F. At the end of the 6 hours, the resulting resole resin solution (Part A) was used in the preparation of the bonding composition (Part B).

*Preparation of Part B*

The neoprene latex No. 571 was measured into a mixing tank with stirring. The zinc oxide paste was added followed by the water (preferably with sufficient ammonia to give a pH of above 9, typically 9.6) and resin solution (Part A).

The resulting dispersion was ready for immediate use but may be stored for a limited time (about 2 days) at room temperature or for prolonged periods of time under refrigeration.

EXAMPLE II

The resole/neoprene latex primer of Example I was also prepared by repeating Example I except that Part A of the bonding composition was prepared in two separate stages. First, a so-called "arrested resin solution" was prepared using the following proportions:

|  | Parts |
| --- | --- |
| Resorcinol | 5.1 |
| NaOh flakes | .3 |
| 37% formaldehyde | 2.15 |
| Water | 4.9 |
| Total | 12.45 |

This arrested solution was prepared by first adding the water to a suitable tank or drum. The NaOH flakes were then added and dissolved by stirring followed by addition and dissolution of the resorcinol. Thereafter, the formaldehyde was added, considerable heat being generated. The tank was cooled to prevent boiling and, after allowing the contents to cool, the resulting composition was stored in stainless steel or lined drums sealed to prevent entrance of air. This composition may be stored for an indefinite period of time as compared to not more than about 20 hours for the Part A composition of Example I.

The required amount of the arrested resin solution (12.45 parts) was transferred from the storage drum to the reaction tank. To this arrested resin solution was added 4.3 parts of 37% formaldehyde and 108 parts of water, the water being added first, with agitation. The resulting mixture was aged for from 1–6 hours at 80–84° F.

After the ageing period, the dispersion with neoprene latex was prepared as in Example I.

EXAMPLE III

This example illustrates preparation of a dual primed polyethylene terephthalate fabric and the bonding thereof to neoprene rubber.

A first primer was prepared by dissolving sufficient methylene bis (4-phenylisocyanate), typically Hylene M–50, in xylene freed from moisture to provide a 5% solids solution.

A piece of 5 oz. polyethylene terephthalate (Dacron) fabric was then padded through the xylene solution so as to leave 1.5–1.75% Hylene solids on the cloth. The fabric was dried at 220° F. for solvent removal.

The thus treated fabric was then run through the second primer specifically, the 20% solids product of Example II (prepared from "arrested master"), and the pad squeeze rolls. This was done two times so as to get a solids add-on of 12–15%. The fabric was dried at 220° F. after each passage through the squeeze rolls. The thus treated fabric was then subjected to a final cure at 320° F. for 5 minutes to remove all traces of moisture and to fully polymerize and crosslink the resole/latex solids. This curing step may be omitted, if desired, with some decrease in potential adhesion. Temperature and time for this cure can be varied but usually will be within the range of 300 to 340° F. for 3–5 minutes.

A conventional uncured, unvulcanized neoprene sheet (neoprene GN green stock) about .040 inch thick was then pressed into contact with the dual primed fabric and vulcanized at 280° F. for 60 minutes. In contrast to adhesions of 2 pounds, 3 pounds and 5-6 pounds using no primer, only the first primer and only the second primer, respectively, the fabric processed according to the above example exhibited an adhesion to the neoprene sheet of 37.5-40 pounds per inch width, the measurements being made on a peel test when the test jaws were separated at a rate of 2" per minute. Substantially equivalent adhesion was obtained using the product of Example I as the second primer.

EXAMPLE IV

The process of Example III was repeated using the polymethylene polyphenyl polyisocyanate product known as PAPI-1 as the polyisocyanate component of the first primer with essentially the same improvement in adhesion between neoprene and polyethylene terephthalate fabric.

It will be appreciated that various other modifications may be made in the invention described herein. For instance, any of the other organic polyisocyanates referred to above may be substituted for those utilized in the foregoing examples. Accordingly, the scope of the invention is defined in the following claims wherein:

I claim:
1. In a process for bonding polyethylene terephthalate fibers to neoprene rubber, the improvement which comprises first treating said polyethylene terephthalate fibers with an organic solvent solution of an organic polyisocyanate, drying the thus treated polyethylene terephthalate fibers, then treating said fibers with an organic solvent-free aqueous composition including a resole and a neoprene latex the ratio of resole solids to neoprene latex solids being between 1:12 and 1:2.5, and again drying the thus treated material, said treating and drying steps preceding the application of the neoprene rubber to said polyethylene terephthalate, the amount of polyisocyanate solids applied to said polyethylene terephthalate being at least 0.5%, based on the weight of dry fibers and the amount of neoprene latex/resole solids being between 5 and 15%, based on the weight of the dry fibers.

2. The process of claim 1 including the further step of curing said resole/latex after drying said fibers, said curing step being carried out prior to the bonding of said neoprene rubber.

3. The process of claim 1 including the further step of applying neoprene rubber to the dried, dual treated polyethylene terephthalate fibers and then vulcanizing the same.

References Cited by the Examiner

UNITED STATES PATENTS 2,990,313   6/1961   Knowles et al. _____ 154—139
2,991,258   7/1961   Nobbs et al. _____ 260—43

FOREIGN PATENTS 595,290   12/1947   Great Britain.

EARL M. BERGERT, *Primary Examiner.*

CARL F. KRAFFT, *Examiner.*